(12) United States Patent
Allasia et al.

(10) Patent No.: US 6,501,830 B1
(45) Date of Patent: Dec. 31, 2002

(54) METHOD OF AND DEVICE FOR MEASURING ECHO PARAMETERS ON TELEPHONE LINES

(75) Inventors: Andrea Allasia, Lombardore (IT); Guido Manzone, Turin (IT)

(73) Assignee: Telecom Italia Lab S.p.A., Turin (IT)

( * ) Notice: Subject to any disclaimer, the term of this patent is extended or adjusted under 35 U.S.C. 154(b) by 0 days.

(21) Appl. No.: 09/445,950

(22) PCT Filed: Jul. 7, 1998

(86) PCT No.: PCT/EP98/04216

§ 371 (c)(1),
(2), (4) Date: Dec. 16, 1999

(87) PCT Pub. No.: WO99/03244

PCT Pub. Date: Jan. 21, 1999

(30) Foreign Application Priority Data

Jul. 11, 1997 (IT) .......................................... TO97A0626

(51) Int. Cl.⁷ .......................... H04M 1/24; H04M 3/08; H04M 3/22

(52) U.S. Cl. ..................... 379/3; 379/22.01; 379/22.02; 379/406.01

(58) Field of Search ...................... 379/3, 22.01, 22.02, 379/406.01, 406.06, 406.8, 406.12–406.16

(56) References Cited

U.S. PATENT DOCUMENTS 3,612,782 A  * 10/1971  Gilbert
5,164,989 A  * 11/1992  Brandman et al.

* cited by examiner

Primary Examiner—Duc Nguyen
(74) Attorney, Agent, or Firm—Herbert Dubno

(57) ABSTRACT

A test signal is injected on the line (L) and the corresponding return signal produced by the line itself as an effect of the echo is detected. A signal having lenticular envelope is used as test signal and is generated preferably starting from a first sinusoid with a first given frequency modulated in amplitude with a second sinusoid having a second given frequency, lower than the aforesaid first given frequency.

10 Claims, 4 Drawing Sheets

METHOD OF AND DEVICE FOR MEASURING ECHO PARAMETERS ON TELEPHONE LINES

FIELD OF THE INVENTION

The present invention tackles the problem of measuring echo parameters on a telephone line.

BACKGROUND OF THE INVENTION

The echo phenomenon, and in particular the echo to the speaker, can occur, for instance, when the telephone line connecting two users exceeds a certain length. The phenomenon causes a degradation of the communication quality, which degradation is less and less tolerable as the return time and the level of the echo increase. For this reason, over the years, the use of echo suppressors, particularly on satellite connections, has gradually become widespread, and eventually the international standardizing bodies have prescribed it. In order to operate correctly, those echo suppressors must know the characteristic parameters of the negative phenomenon to be contrasted and the suppressing action is all the more effective the more precise and accurate is the measurement of the characteristics of the echo.

For this purpose, measuring the round-trip propagation time and the residual level of a test signal injected into the line is generally known in the art.

The problem of identifying the most important information to be extracted from the received echo, i.e. the time interval between the echo and the test signal (or stimulation signal) sent onto the line, would be easily solved if the transmission channel were ideal, i.e. with unlimited band and without noise. Actually, in such case all that needs to be done is to determine the instant at which the received echo reaches its peak value with respect to the stimulation signal sent into the line. The availability of an unlimited band, or at least a very broad band, would also allow conferring to the test signal the nature of an impulsive signal, with very steep front, with the subsequent possibility of measuring with high precision the instant of arrival of an essentially identical return signal.

The need to operate on a telephone channel (thus a channel whose band is essentially limited from 300 to 3400 Hz) makes the measurement much more critical, also in consideration of the fact that the line is affected by noise, so that the simultaneous presence of echoes and of a high level of background noise often occurs.

A solution often adopted for measuring echo parameters on a telephone line is using, as a test signal, a sinusoidal signal which is injected into the line for a certain time interval and then stopped. The measurement of the echo is then compared to the measurement of the duration of the time interval elapsed between the instant which the test signal was stopped and the instant at which the corresponding return signal detected on the line ceases.

This solution is found to be unsatisfactory for several reasons.

First, the duration of the aforesaid time interval is determined not only by the echo phenomenon but also by the distortion (in the sense of a prolongation of the time duration, since a narrow band channel is dealt with) the test signal undergoes as an effect of its propagation along the line.

The test signal used in such solution can be seen as the product of a sinusoid by a rectangular window of a duration equal to the time interval between the instant wherein the test signal starts being injected into the line and the instant wherein that signal is interrupted.

The width of the window must preferably be a multiple of half the period of the sinusoid, and in phase therewith, in order to limit the harmonic content originated by the signal fronts. The response to such a stimulation signal by a real telephone channel comprises a train of sinusoids distorted by the effect of the channel, also in the form of a sort of offset (translation of the received signal with respect to an ideal vertical amplitude scale). This phenomenon, which can be ascribed to the cut off of the low frequencies, below about 300 Hz, typical of the telephone channel, makes it even more critical to detect correctly the transitions of the return signal. The aforesaid phenomenon can be recovered, but the related recovery time constant is too long with respect to the normal measurement time required to perform an effective intervention. In this respect it should be noted that the propagation delay (the quantity that in fact identities the echo phenomenon) typically does not exceed 30 milliseconds for a terrestrial telephone connection, and is about 260 milliseconds (in one direction, thus with a round-trip time of the signal of about 520 milliseconds), if the connection comprises a satellite link.

There is therefore a need to provide a solution that allows measuring in a precise and accurate manner the echo that may be present on a telephone line, taking into account the following requirements:

- the test signal should occupy a limited band, compatible with the template of the telephone channel, in order to avoid the signal alteration phenomena mentioned above;
- the test signal must have a limited time duration, in order to allow discrimination of echo times even with reduced duration without overlapping of the test signal and of the return signal;
- an echo signal of acceptable amplitude must be obtained, with the consequent possibility of measuring its level (to be referred to the level of the test signal, which should preferably present a maximum level) so as clearly to discriminate the echo signal above the noise level.

OBJECT OF THE INVENTION

The object of the present invention is to provide a solution capable of meeting the requirements mentioned above in an excellent manner, and in particular of meeting the first two requirements described, which in fact are mutually contrasting.

SUMMARY OF THE INVENTION

According to the present invention, this object is attained thanks to a method of measuring echo parameters on telephone lines which comprises the operation of injecting into the line (L) a test signal and detecting the corresponding return signal produced by the line (L) itself as an effect of the echo. The invention uses, as the test signal, an impulse (pulsed) sinusoidal signal with a lenticular envelope, with a limited time duration (a) such that a local maximum of the envelope can be identified both in the test signal and in the return signal, and having zero value at the beginning and at the end of its duration.

The test signal is generated starting from a first sinusoid with a first given frequency ($\omega_p$). The duration (a) is linked to the period of the second sinusoid and can be equal to half the period of the second sinusoid.

The test signal (x(t)) can be expressed in the form:

$$x(t)=\sin(\omega_p t)\cdot\sin(\omega_m t)\cdot\mu(t)\cdot\mu(ta),$$

where: $\omega_p$ is the first given frequency, $\omega_m$ is the second given frequency, and $\mu(t)$ is the unitary step function.

The return instant of the return signal is determined by detecting the rising edge of the envelope of the return signal. The return signal is subjected to full wave rectifying.

The test signal can be varied in an adaptive manner. The device for measuring echo parameters on telephone lines can comprise means for injecting on the line a test signal as well as means for detecting the corresponding return signal produced by the line itself as an effect of the echo. The device includes signal generating means arranged to generate, as test signal, an impulsive signal with lenticular envelope with a limited time duration (a) such that a local maximum of the envelope can be identified both in the test signal and in the return signal, and having zero value at the beginning and at the end of its duration.

The means for generating the test signal can comprise:

a first generator for generating a first sinusoid at a first given frequency ($\omega_p$), a second generator for generating a second sinusoid at a second given frequency ($\omega_m$), lower than the first frequency, and modulating means for amplitude modulating the first sinusoid by the second sinusoid.

The means for generating the test signal can comprise means for generating a window signal, as well as means for applying the window signal to the test signal to confer it with a duration (a) related to the period of the second sinusoid.

The means for generating a window signal can comprise a divider element to confer to the window signal a duration (a) equal to half the period of the second sinusoid. The means for generating a window signal can comprise a control circuit to control the repetition rate of the test signal. Receiving means responsive to the return signal and arranged to detect the rising edge of the envelope of the return signal itself. The receiving means can comprise a rectifier circuit, preferably a full wave rectifier, acting on the return signal. The receiving means comprise filter means to reduce the noise content of the return signal. The filter means can comprise a first filter and a second tuneable filter in cascade. This filter means can be positioned upstream of the rectifier circuit.

The device can comprise a clipping circuit to transform the return signal into a square-wave signal. A low-pass filter can be interposed between the rectifier circuit and the clipping circuit.

A counter element can be started upon emission of the test signal and stopped upon detection of the return signal (R), the count value of the counter element at the stop being indicative of the return time of the echo to be measured. The counter element can be started in correspondence with the rising edge of the envelope of the test signal. The counter element is stopped in correspondence with the rising edge of the envelope of the return signal. Preferably the signal generating means are selectively adaptive to make selectively variable the test signal.

The invention shall now be described, purely by way of non-limiting example, with reference to the accompanying drawings, wherein:

FIG. 1 schematically shows a possible connection arrangement of a device according to the invention for measuring echo parameters on telephone lines;

SPECIFIC DESCRIPTION

Figure 1:
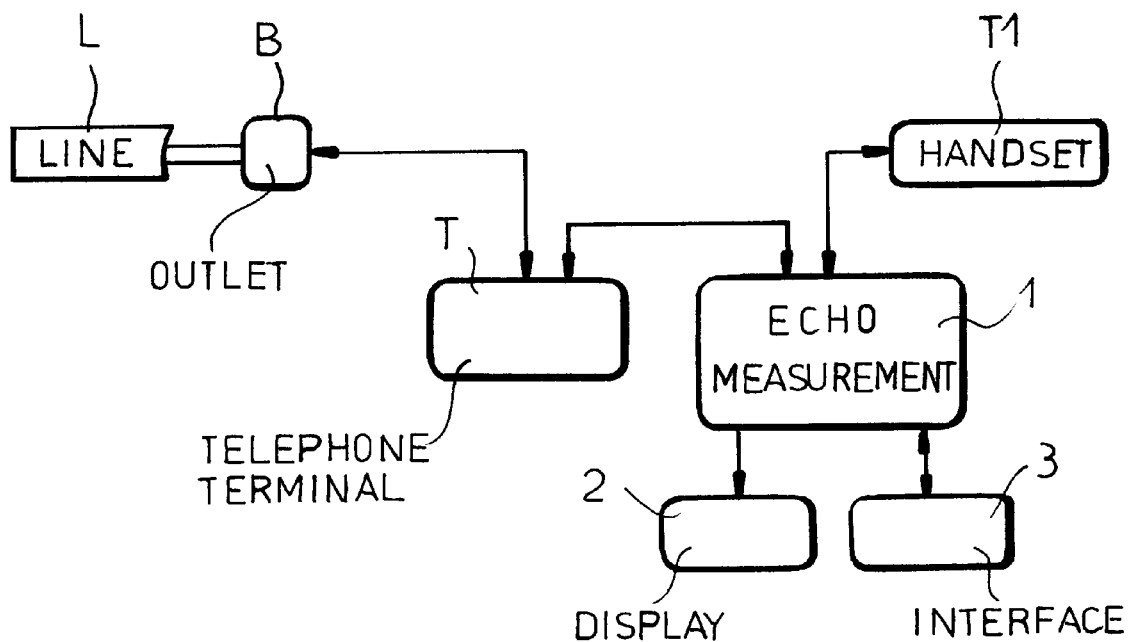

In FIG. 1 reference 1 indicates in its entirety a device for measuring the echo on telephone lines. According to a possible embodiment of the invention, device 1 can be associated to a telephone terminal T connected to a telephone line L, affected by an echo phenomenon whose characteristics are to be measured (especially echo return time and intensity), through a so-called outlet B. Device 1 is usually fitted also with a unit 2 for displaying the results of the measurement as well as, for instance, with an interface module 3 for connection e.g. to a processing unit (typically a personal computer) for data acquisition and/or for the device control.

Device 1 according to the invention is suitable for being interposed between terminal T and a handset T1 associated thereto.

Of course, such a connection arrangement is to be interpreted purely by way of example. It corresponds to a condition in which device 1 according to the invention can be easily interfaced with any type of telephone terminal, regardless of the type of connection thereof to the respective exchange, the interfacing being accomplished by sectioning the connection between handset and telephone terminal. The solution shown in FIG. 1 is suitable for being put in practice, usually, by utilizing a second cord equal to the one normally installed on the terminal.

Although hereafter this point (which in itself is not of relevance for the understanding of the invention) will no longer be explicitly referred to, device 1 can be connected even in a totally different manner from the one described. For instance it can be connected to the microphone (injection of the test signal) and to the earphone (reception of the echo signal) of handset T1 through phonic couplers, thereby allowing a "field" intervention on a conventional telephone receiver wherein the cable (cord) connecting handset T1 and terminal T cannot be easily removed, and/or execution of the measurements by using a sound pressure on the microphone in accordance with ITU-T recommendations. The solution according to the invention in any case is suitable for use at the exchange level, or at the level of the base station of a mobile radio system, in this case allowing a direct integration with the echo suppressors usually located therein. It should also be specified that the solution according to the invention is suited to be used on a traditional analogue network (PSTN, or Public Switched Telephone Network) or on a digital network (ISDN or Integrated Service Digital Network).

Figure 2:
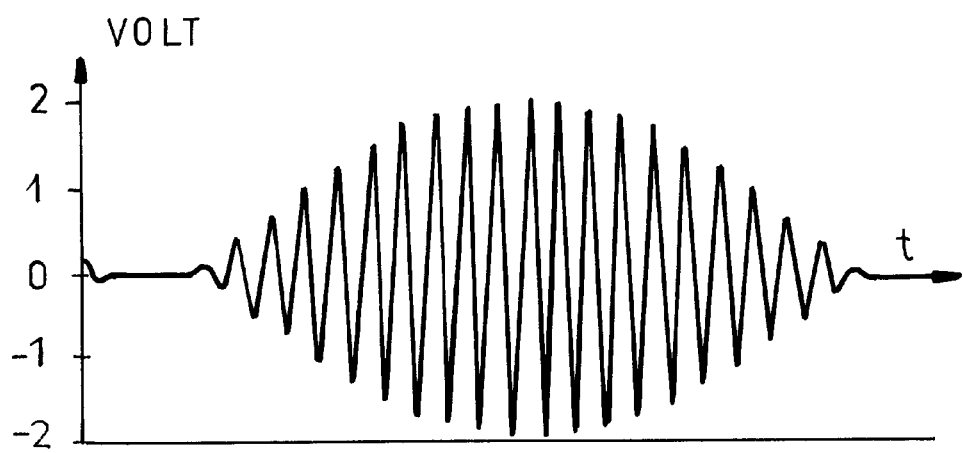
FIG. 2 shows the typical profile of a usable test signal according to the invention.

The diagram in FIG. 2 shows the typical profile over time of a signal suitable for being used as a test signal in the solution according to the invention.

In general, such a signal can be defined as having a lenticular (or eye shaped) envelope, which can generally be expressed according to a relation of the following kind:

$$x(t)=\sin(\omega_p t)\cdot\sin(\omega_m t)\cdot\mu(t)\cdot\mu(ta) \qquad (1)$$

Hence, in the embodiment shown, such a signal is a sinusoidal signal having a first frequency ($f_p=\omega_p/2\pi$) which is modulated with a sinusoid having a second frequency ($f_m=\omega_m/2\pi$), lower than the first, and having a half period with a duration equal to the duration of the rectangular signal ($\mu(t)\cdot\mu(t-a)$ (where $\mu(t)$ indicates the step function with unitary amplitude) used as a window to confer to signal x(t) the character of an impulsive signal with duration a.

That signal presents a symmetrical lenticular envelope, but such a profile, shown here purely by way of example, is not to be interpreted as limiting the scope of the invention. The invention can be performed also by using signals with asymmetric lenticular envelope, for instance an envelope where the up and down transitions are not symmetrical, or yet signals in which the sinusoid being amplitude modulated has variable frequency (for instance decreasing frequency or increasing frequency, i.e. with a profile of the type currently called "chirp").

By way of reference, the tests performed so far by the Applicant have demonstrated as particularly advantageous the choice of values $\omega_p$ and $\omega_m$ respectively corresponding to frequencies respectively around roughly 2 kHz (high frequency, amplitude modulated sinusoid angular frequency) and 125 Hz (modulating sinusoid, with lower frequency), with a corresponding choice of the time duration of the rectangular signal or window equal to about 4 milliseconds.

In any case, the aforesaid values can be changed, even in a considerable manner, according to the specific application requirements.

When examined in the frequency domain, the stimulation signal shown in FIG. 2 presents a main lobe having a frequency occupation equal roughly to half that of a signal with an overall rectangular envelope.

The amplitude modulation that gives rise to the aforesaid lenticular profile allows identifying a local maximum of the envelope both in the stimulation signal and in the return signal, which allows measuring with precision the time distance between the two signals also in the presence of their partial overlap.

At the same time, it was noted that the use of a stimulation signal like the one described above allows obtaining a short echo, with an acceptable peak amplitude, thus clearly distinguishable from the background noise, without leading to undesired channel saturation phenomena.

Figure 3:
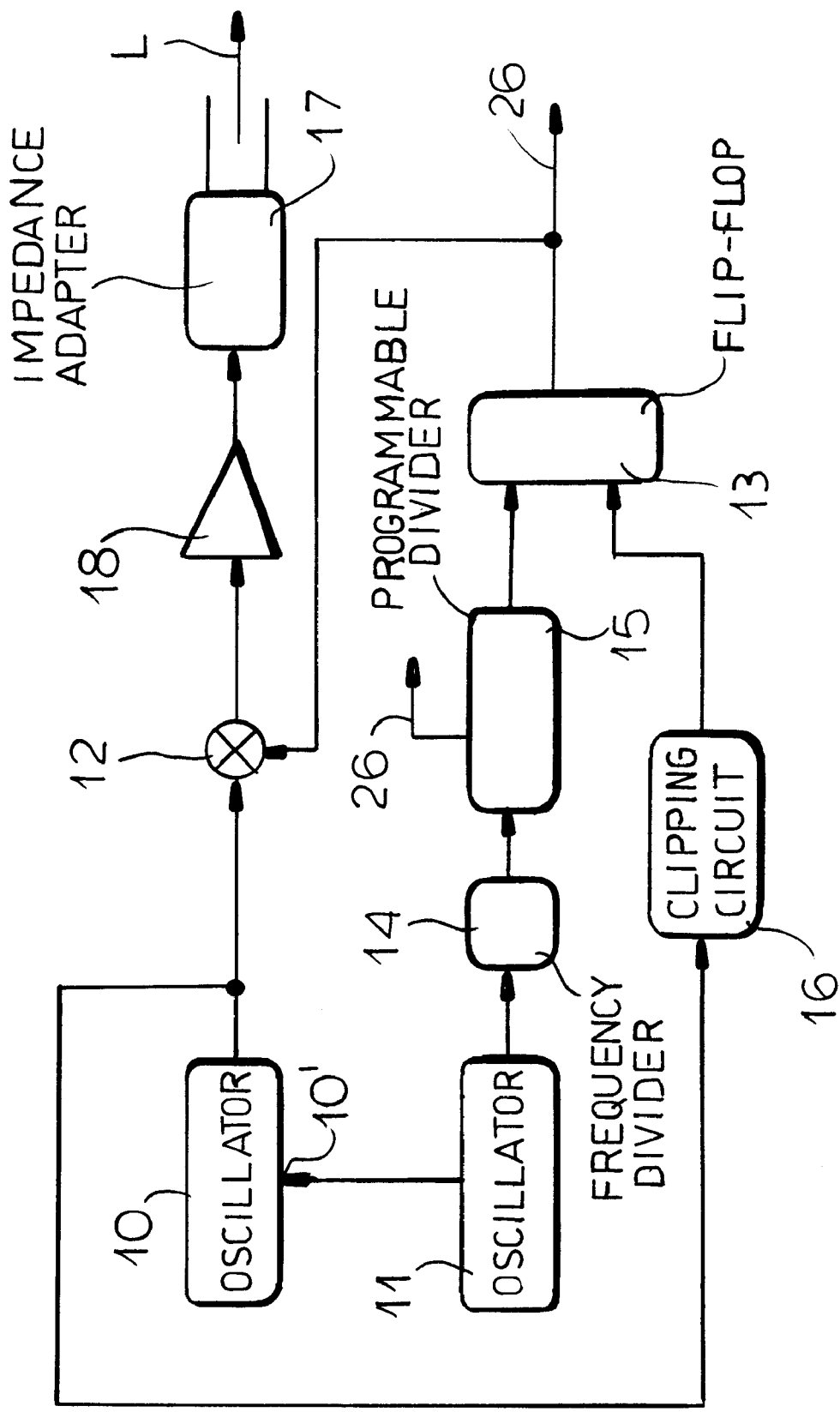
FIG. 3 and FIG. 4 show, in the form of block diagrams, respective component parts of a device according to the invention.

The block diagram in FIG. 3 shows a possible configuration of the part of device 1 destined to generate and to inject on line L a stimulation signal such as the signal shown in FIG. 2.

In that diagram, reference 10 indicates a generator (oscillator) destined to generate the modulated sinusoid (i.e. the one with higher frequency $\omega_p=2\pi f_p$, first frequency) and provided with an input 10' to which the modulating sinusoid (with lower frequency, $\omega_m=2\pi f_m$, second frequency) is applied by another oscillator circuit 11.

The block indicated as 10 can easily be obtained by using an integrated circuit function generator which can be amplitude modulated, of any commercially available type. This possible choice offers the additional advantage that in this circuit the number of periods of modulated sinusoid included in half a period of the modulating sinusoid (i.e. the number of periods of modulated sinusoid included in each stimulation pulse) is obtained simply by varying the amplitude of the modulating signal coming from circuit 11, thus making the use of a counter actually superfluous, though such a counter can be provided in other possible embodiments.

The signal exiting oscillator 10 is carried to a multiplication node 12, which receives at the other input the rectangular window signal, which determines the duration of the stimulation signal. This signal is produced, in the embodiment shown, as an output of a JK flip-flop circuit 13, of which the two inputs respectively are:

the modulating sinusoidal signal produced by oscillator 11, divided in frequency by two in a frequency divider 14 and made to pass through a programmable divider 15 whose function is simply to allow the duty cycle of the related signal to be varied selectively, thereby selectively varying the repetition rate of the stimulation signal, for instance 100 milliseconds (a duration sufficient for echo characterisation in terrestrial telephone connections) or more (for instance when a satellite link is involved in the connection), and the same signal exiting the oscillator 10 and made to pass through a clipping circuit 16.

The output signals of blocks 13 and 15 are also carried to a block 26 (FIG. 4) in the device portion destined to the extraction of the return signal, as shall be better explained hereafter.

Before being injected into line L through an impedance adapter 17, the signal generated in multiplication node 12 is also made to pass through an amplifier 18 or an equivalent gain regulating circuit, in order to bring the signal sent to the line back to a selectively determined level (for instance, −12.8 dBm).

Figure 4:
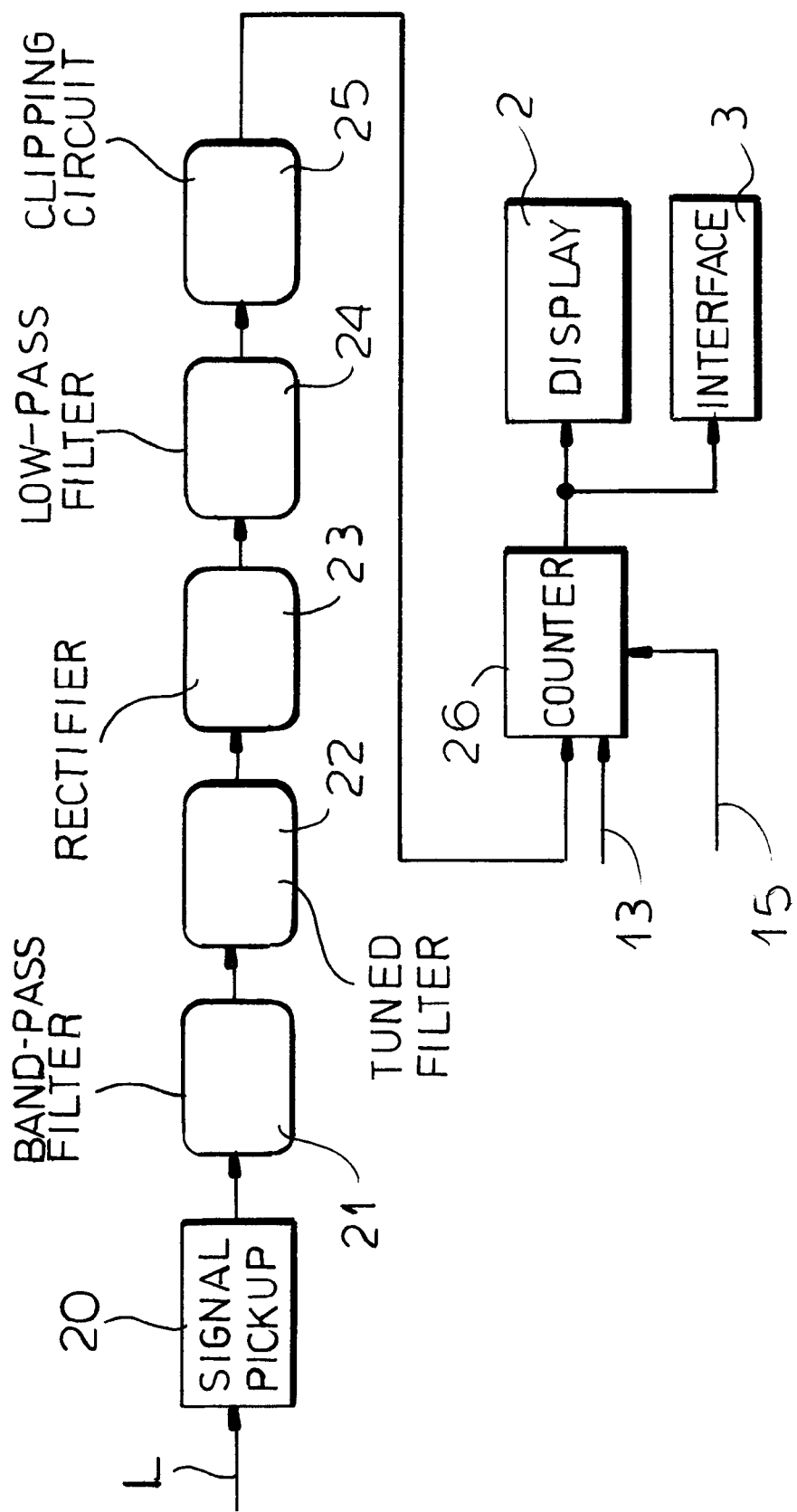

The block diagram in FIG. 4 instead shows the cascade of circuit elements through which the return signal coming from line L passes.

One of the most current techniques to detect the instant of arrival of a given return signal (technique adopted also in very different sectors from the one considered here, such as radar or sonar techniques) consists of using a threshold detector activated by the signal whose instant of arrival is to be determined.

This type of detection can suffer, when sinusoidal signals are used, from inaccuracies stemming from the fact that the difference in amplitude between adjacent peaks in the received signal, even if minimal, can cause a time offset of the determined arrival instant. This is because the threshold comparator can be triggered on the wrong period. The uncertainty is obviously correlated to the period of the stimulation signal, and hence it is the smaller, the closer adjacent peaks are located. In any case the noise conditions, especially when the signal-to-noise ratio is around or below 10 dB, can in fact make the measurement very critical.

A solution suited to solve this drawback, also within the context of the invention, is to subject the return signal to digital processing techniques (also known as DSP), for instance through auto-correlation computations between the received signal and various sample signals. These solutions, however, can be onerous, in terms of both time and hardware required.

For this reason, the embodiment of the invention that is preferred at the moment seems to be the adoption of the solution shown schematically in FIG. 4, which presents the advantage of an extreme construction simplicity, also from the circuit point of view.

In this solution, the return signal extracted from line L (usually taken from the circuit of the earphone that is excluded from the circuit) is normally conditioned (for instance by means of a coil similar to the one of the generator which allows unbalancing the amplified input signal) in a circuit 20 to be subsequently filtered in a band-pass filter 21. This can be, for instance, a first order filter tuned at about 2 kHz (value which roughly corresponds to the central frequency of the conventional telephone channel), whose filtering action, destined essentially to reduce the noise content of the signal, can possibly be refined by a further filtering, effected in 22, with an additional tuneable filter, also tuned on or about the central frequency of the first filter 21.

The signal thus processed is fed to a rectifier 23, preferably a full wave rectifier, which allows recovering most of the energy of the received signal with the additional possibility to halve the value of the time constant of the subsequent low-pass filter 24. The latter extracts the envelope of the return signal destined to be subsequently sent to a clipping circuit 25.

It will be appreciated that the full wave rectifier intrinsically performs a frequency duplication function, with the consequence of making the rising edge of the return signal steeper, and thus capable of being more sharply discriminated over time as a result of the clipping action.

The solution according to the invention presents, among others, the interesting characteristic of allowing the measurement of the return time of the echo signal to be brought back to a measurement of the time location of the rising edge (and in particular of the rising edge of the envelope) of the return signal, with consequent elimination of the time lengthening effect which the test signal may undergo in the course of its propagation on the channel.

Figure 5A:
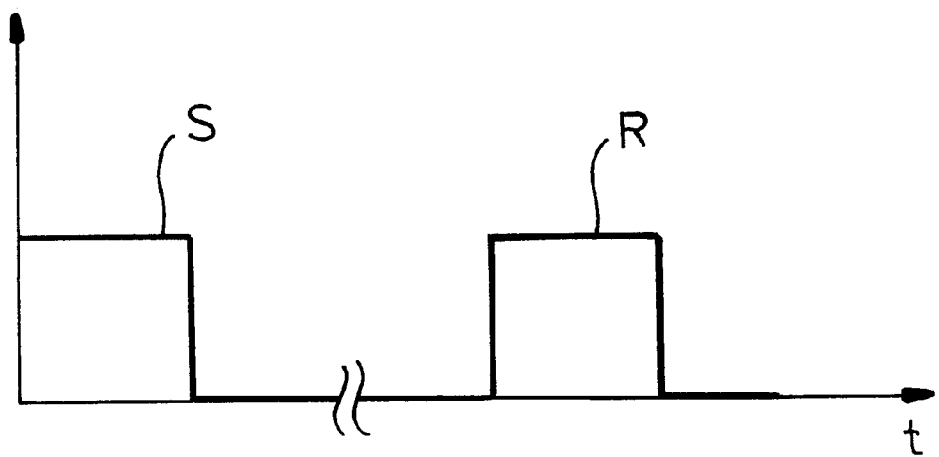
FIGS. 5A and 5B are diagrams showing the typical profile of some signals generated within the device portion shown in FIG. 4.

The diagram in FIG. 5a shows a typical possible relative time position of a signal S corresponding to the emission of a stimulation signal (in practice signal S can be seen as the output signal of flip-flop 13 in FIG. 3) and of another signal, indicated as R, essentially corresponding to the output signal of clipping circuit 25, thus a signal obtained as a result of the clipping operation performed on the envelope of the received return signal. The aforesaid two signals are carried to the input of a counting and measuring circuit 26 whose operation is shown schematically by the diagram in FIG. 5b.

Circuit 26 is usually made by a counter which is started by the rising edge of signal S and stopped by the rising edge of signal R.

Figure 5B:
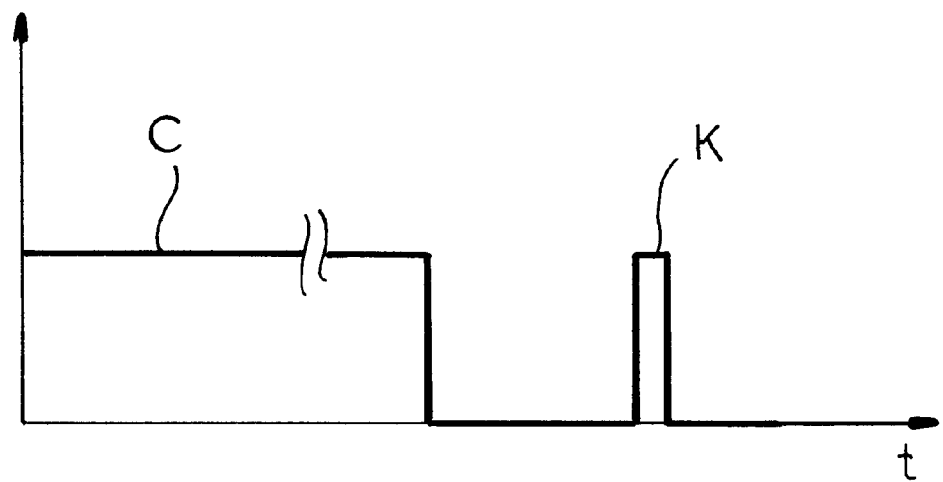

The count duration (in practice the counted value, schematically represented by signal C in FIG. 5b) corresponds to the return time of the echo to be determined. The measured value can be presented externally and/or collected in view of the acquisition of the data by using units 2 and 3 described at the beginning of the present detailed description. Counter 26 is then reset to start a new count by a reset signal K obtained, for instance, through programmable divider 15 which controls the repetition period of the stimulation pulses, thus of the measurement cycles.

The measurement of the other parameter of the echo signal, i.e. the level of the echo signal, is conducted according to known criteria and with known circuit components, whose detailed description herein is superfluous.

Of course, leaving the principle of the invention unchanged, the construction details and embodiments can be varied widely with respect to what is described and shown herein, without thereby departing from the scope of the present invention as defined in the appended claims. For instance, if the device is associated to a control processing unit, capable of receiving information about the characteristics of the line, the stimulation signal can be made adaptive according to said characteristics, by acting for instance on the various elements of the generation chain (10 to 16, for instance) shown in FIG. 3.

We claim:

1. A device for measuring echo parameters on telephone lines, comprising means for injecting on the line a test signal as well as means for detecting a corresponding return signal produced by the line itself as an effect of the echo, which comprises:

signal generating means arranged to generate as test signal, an impulsive signal with lenticular envelope with a limited time duration (a) and having zero value at the beginning and at the end of its duration and generated starting from a first sinusoid with a first given frequency ($\omega_p$) amplitude modulated by a second sinusoid with a second given frequency ($\omega_m$) lower than said first frequency ($\omega_p$) with a local maximum of said envelope being identified both in the test signal and in the return signal, said generating means comprising:

a first generator for generating said first sinusoid, a second generator for generating said second sinusoid, modulating means for amplitude modulating said first sinusoid by said second sinusoid, and means for generating a window signal as well as means for applying said window signal to said test signal to confer on it a duration (a) related with the period of said second sinusoid, said means for generating said window signal comprising a divider element to confer to said window signal a duration (a) equal to half the period of said second sinusoid.

2. The device as claimed in claim 1 wherein said means for generating a window signal comprises a control circuit to control the repetition rate of said test signal.

3. A device for measuring echo parameters on telephone lines, comprising means for injecting on the line a test signal as well as means for detecting a corresponding return signal produced by the line itself as an effect of the echo, which comprises:

signal generating means arranged to generate as test signal, an impulsive signal with lenticular envelope with a limited time duration (a) and having zero value at the beginning and at the end of its duration and generated starting from a first siusoid with a first given frequency ($\omega_p$) amplitude modulated by a second sinusoid with a second given frequency ($\omega_m$) lower than said first frequency ($\omega_p$) with a local maximum of said envelope being identified both in the test signal and in the return signal, and receiving means responsive to said return signal and arranged to detect the rising edge of the envelope of the return signal itself, said receiving means comprising a rectifier circuit including a full wave rectifier acting on said return signal.

4. A device for measuring echo parameters on telephone lines, comprising means for injecting on the line a test signal as well as means for detecting a corresponding return signal produced by the line itself as an effect of the echo, which comprises:

signal generating means arranged to generate as test signal, an impulsive signal with lenticular envelope with a limited time duration (a) and having zero value at the beginning and at the end of its duration and generated starting from a first siusoid with a first given frequency ($\omega_p$) amplitude modulated by a second sinusoid with a second given frequency ($\omega_m$) lower than said first frequency ($\omega_p$) with a local maximum of said envelope being identified both in the test signal and in the return signal, and receiving means responsive to said return signal and arranged to detect the rising edge of the envelope of the return signal itself, said receiving means comprising a filter means to reduce noise content of said return signal, said filter means being a first filter and a second tuneable filter in cascade with the first filter.

5. The device as claimed in claim 3 wherein said filter means are positioned upstream of said rectifier circuit.

6. A device for measuring echo parameters on telephone lines, comprising means for injecting on the line a test signal as well as means for detecting a corresponding return signal produced by the line itself as an effect of the echo, which comprises:

signal generating means arranged to generate as test signal, an impulsive signal with lenticular envelope with a limited time duration (a) and having zero value at the beginning and at the end of its duration and generated starting from a first siusoid with a first given frequency ($\omega_p$) amplitude modulated by a second sinusoid with a second given frequency ($\omega_m$) lower than said first frequency ($\omega_p$) with a local maximum of said envelope being identified both in the test signal and in the return signal, and a clipping circuit to transform said return signal into a square-wave signal.

7. The device as claimed in claim 6 which comprises a low-pass filter interposed between said rectifier circuit and said clipping circuit.

8. The device as claimed in claim 6 which comprises a counter element started upon emission of said test signal and stopped upon detection of said return signal, the count value of the counter element at the stop being indicative of the return time of the echo to be measured.

9. The device as claimed in claim 3 wherein said counter element is started in correspondence with the rising edge of the envelope of said test signal.

10. The device as claimed in claim 9 wherein said counter element is stopped in correspondence with the rising edge of the envelope of said return signal.

* * * * *